US009359525B2

(12) United States Patent
Lavalaye et al.

(10) Patent No.: US 9,359,525 B2
(45) Date of Patent: Jun. 7, 2016

(54) ANHYDROUS COMPOSITION AS A COATING AGENT FOR FUNCTIONAL LAYERS OF A MULTILAYER PAINT

(75) Inventors: Jorn Lavalaye, Würzburg (DE); Norbert Löw, Nuestadt/Aisch (DE)

(73) Assignee: BASF Coatings GmbH, Munster (DE)

( * ) Notice: Subject to any disclaimer, the term of this patent is extended or adjusted under 35 U.S.C. 154(b) by 534 days.

(21) Appl. No.: 13/520,124

(22) PCT Filed: Dec. 28, 2010

(86) PCT No.: PCT/EP2010/070796
§ 371 (c)(1),
(2), (4) Date: Nov. 30, 2012

(87) PCT Pub. No.: WO2011/080268
PCT Pub. Date: Jul. 7, 2011

(65) Prior Publication Data
US 2013/0071668 A1 Mar. 21, 2013

(30) Foreign Application Priority Data

Dec. 31, 2009 (DE) .................. 10 2009 060 803

(51) Int. Cl.
| | |
|---|---|
| *C09D 167/02* | (2006.01) |
| *C08L 67/02* | (2006.01) |
| *B05D 7/00* | (2006.01) |
| *C08G 18/42* | (2006.01) |
| *C08G 18/80* | (2006.01) |
| *C08G 63/91* | (2006.01) |
| *C09D 5/36* | (2006.01) |
| *C09D 7/12* | (2006.01) |
| *C09D 167/00* | (2006.01) |
| *C09D 175/06* | (2006.01) |
| *C08L 33/00* | (2006.01) |
| *C08L 61/28* | (2006.01) |
| *C08L 75/06* | (2006.01) |

(52) U.S. Cl.
CPC .............. *C09D 167/02* (2013.01); *B05D 7/532* (2013.01); *B05D 7/572* (2013.01); *C08G 18/4291* (2013.01); *C08G 18/807* (2013.01); *C08G 63/914* (2013.01); *C08L 67/02* (2013.01); *C09D 5/36* (2013.01); *C09D 7/125* (2013.01); *C09D 167/00* (2013.01); *C09D 175/06* (2013.01); *B05D 7/574* (2013.01); *B05D 2451/00* (2013.01); *B05D 2502/00* (2013.01); *B05D 2503/00* (2013.01); *B05D 2504/00* (2013.01); *B05D 2508/00* (2013.01); *C08L 33/00* (2013.01); *C08L 61/28* (2013.01); *C08L 75/06* (2013.01); *Y10T 428/31551* (2015.04); *Y10T 428/31786* (2015.04)

(58) Field of Classification Search
CPC .............................. C09D 167/02; C08L 67/02
See application file for complete search history.

(56) References Cited

U.S. PATENT DOCUMENTS

| | | | |
|---|---|---|---|
| 4,477,536 A * | 10/1984 | Wright et al. ................. | 428/522 |
| 5,256,453 A | 10/1993 | Heithorn et al. | |
| 5,710,208 A * | 1/1998 | Bederke ............ | C09D 133/064 |
| | | | 524/513 |
| 6,359,080 B1 * | 3/2002 | Marx et al. .................... | 525/444 |
| 6,376,589 B1 * | 4/2002 | Tanaka ................. | C08G 18/792 |
| | | | 524/413 |
| 6,437,056 B1 | 8/2002 | Dahm et al. | |
| 6,538,059 B1 | 3/2003 | Muller et al. | |
| 6,586,097 B1 | 7/2003 | Pascault et al. | |
| 6,770,702 B1 | 8/2004 | Muller et al. | |
| 2003/0158321 A1 | 8/2003 | Watanabe et al. | |
| 2004/0077778 A1 * | 4/2004 | Hazan et al. .................. | 524/589 |
| 2008/0076868 A1 | 3/2008 | Green et al. | |
| 2010/0047462 A1 | 2/2010 | Jansing et al. | |

FOREIGN PATENT DOCUMENTS

| | | | |
|---|---|---|---|
| CN | 10-1289594 A * | 10/2008 | .......... C09D 167/00 |
| DE | 19810220 A1 | 9/1999 | |
| DE | 102005032346 A1 | 1/2007 | |
| DE | 102006053776 A1 | 5/2008 | |
| EP | 0480959 B1 | 9/1994 | |
| EP | 0893483 A2 | 1/1999 | |
| EP | 1185568 B1 | 12/2002 | |
| EP | 1173491 B1 | 12/2003 | |
| EP | 1954771 B1 | 1/2009 | |
| EP | 1940977 B1 | 3/2012 | |
| FR | 2791689 A1 | 10/2000 | |
| FR | 2870453 A1 | 11/2005 | |
| JP | H06-248230 | 9/1994 | |
| JP | H06-346024 | 12/1994 | |

(Continued)

OTHER PUBLICATIONS

English Translation of International Search Report for International Application No. PCT/EP2010/070796 issued Feb. 4, 2011, 3 pages.
Written Opinion for International Application No. PCT/EP2010/070796, issued Feb. 4, 2011, 11pages.
English Translation of International Preliminary Report on Patenability for International Application No. PCT/EP2010/070796 issued Jul. 10, 2012, 8 pages.
Amino Crosslinkers Product Guide: CYMEL Resins, *Allnex* 2014, 20 pages.

*Primary Examiner* — Robert Harlan
(74) *Attorney, Agent, or Firm* — Servilla Whitney LLC

(57) ABSTRACT

Water-free composition comprising at least one saturated or unsaturated, epoxy-modified polyester as binder, at least one acrylate polymer or polyurethane polymer as further binder, polymer microparticles, at least one polymer which comprises functional groups consisting of blocked isocyanates and amino resins, as crosslinking agent, at least one pigment, at least one organic solvent, and at least one auxiliary or additive, the solids of the composition being at least 50% by weight.

16 Claims, No Drawings

(56) References Cited

FOREIGN PATENT DOCUMENTS

| WO | WO9624619 | A1 | 8/1996 |
| WO | WO9942529 | A1 | 8/1999 |
| WO | WO9942531 | A1 | 8/1999 |
| WO | WO0172909 | A2 | 10/2001 |
| WO | WO0181483 | A2 | 11/2001 |
| WO | WO03050194 | A1 | 6/2003 |
| WO | WO03089477 | A1 | 10/2003 |
| WO | WO03089487 | A1 | 10/2003 |
| WO | WO2005007762 | A1 | 1/2005 |
| WO | WO2005063897 | A2 | 7/2005 |
| WO | WO2006062666 | A1 | 6/2006 |
| WO | WO2006063304 | A1 | 6/2006 |

* cited by examiner

US 9,359,525 B2

ANHYDROUS COMPOSITION AS A COATING AGENT FOR FUNCTIONAL LAYERS OF A MULTILAYER PAINT

CROSS REFERENCE TO RELATED APPLICATIONS

This application is a National Phase Application of Patent Application PCT/EP2010/070796 filed on 28 Dec. 2010, which claims priority to DE 10 2009 060 803.6, filed 31 Dec. 2009, both of which are hereby incorporated by reference in their entirety.

FIELD OF THE INVENTION

The present invention relates to a water-free composition, to its use as a coating material, to multicoat paint systems comprising these compositions, to methods of producing the multicoat paint systems, and to their use. The invention further relates to substrates coated with the composition and with the multicoat paint system.

BACKGROUND OF THE INVENTION

Multicoat paint systems used in the automotive OME finishing segment nowadays consist in general of an electrophoretically applied primer, which protects against corrosion and stone chipping, and a subsequent surfacer coat, which protects against stone chipping and smoothens the surface. The surfacer coat is usually applied to the already baked primer, and cured. An alternative possibility is to cure primer and surfacer coat jointly. Applied subsequently to the cured surfacer coat is a single-coat finish or a decorative two-coat finish composed of a color and/or effect basecoat, which is applied in one or more spray passes as a function of the respective shade, and a protective clearcoat, which is applied wet-on-wet to the basecoat. Subsequently the single-coat finish or the basecoat(s) and the clearcoat is or are jointly cured. The last-mentioned "wet-on-wet" process sequence is also referred to as "2-Wet", "2-Coats-1-Bake" or "2C1B".

"Wet-on-wet finishing" is a term for dual or multiple painting without intermediate drying (Römpp Lacke and Druckfarben, Georg Thieme Verlag Stuttgart/New York 1998, page 406, entry heading "Wet-on-wet finishing").

In recent years the reduction of VOC and $CO_2$ emissions has become more and more significant. Firstly there has been an increase here in the use of paints having a low solvent content, as in the case of the waterborne paints, powder coatings and high-solids paints. Increasingly, however, automakers are aiming to reduce the coat thicknesses of the paint system and also the number of operations and also, where appropriate, the number of coats, without any deterioration in the profile of performance properties of the multicoat paint systems, more particularly with no deterioration in the technological properties. Thus "wet-on-wet-on-wet" systems (also known as "3-Wet", "3-Coats-1-Bake", and "3C1B") have been developed, where first a functional layer, then a basecoat and finally a clearcoat are applied wet-on-wet in succession and are jointly cured. With this process, the surfacer coat normally situated between cathodic electrocoat (CEC) and basecoat is omitted. Such processes allow savings in terms of the separate surfacer painting line and the surfacer oven. As well as a reduction in $CO_2$ emissions, this also results, through a reduction in the quantity of paint employed, in significant economic advantages to the automakers.

In the 3C1B process, the functions of the surfacer coat, such as providing protection from stone chipping, smoothing of the surface, assisting the hiding power of the basecoat in the case of basecoat materials with a low hiding power, preventing the delamination of the electrophoretically applied primer, and providing the multicoat paint system with UV protection, for example, are taken on by a functional layer. This layer is obtained from UV-impermeable coating materials. Moreover, there must overall be no deterioration in the properties of a multicoat paint system—this means, for example, that the corrosion control properties are not to be impaired. Furthermore, the functional layer is intended to exhibit a certain physical drying and appropriate solubility parameters in order to prevent mixing of the functional layer with the basecoat, thus ensuring effective flop on the part of effect basecoat materials.

Patent application US 2003/0158321 discloses a 3C1B process. In that case the functional layer is based on polyester-melamine and additionally comprises blocked isocyanates, NAD (Non-Aqueous Dispersion) binder particles having a core/shell structure, and talc. The NAD binder particles result in a sharp increase in viscosity after application and thereby raise the solubility parameters between the surface of the functional layer and the basecoat, thus preventing mixing between the two films. These coating materials, however, are sensitive to runs and have a poor appearance at high film thicknesses. At low film thicknesses, in contrast, the UV resistance is poor. In order to ensure sufficient stonechip adhesion, talc is necessary additive. When talc is used, however, the adhesion after moisture exposure is inadequate.

European patent applications EP-A-1940977 and EP-A-1954771 both describe 3C1B processes in which the functional layer is essentially free from NAD binder particles and/or crosslinked microgel binder particles.

In order to ensure the required physical drying between the functional layer and the basecoat layer after application, EP 1940977 describes a dispersed graft polymer, composed of a non-crosslinked acrylic resin core, which is insoluble in apolar organic solvents, and an acrylate stabilizer, in the form of a macromonomer, which is grafted on the core and which is soluble in apolar organic solvents. The functional layer further comprises at least one apolar solvent. In this application as well, talc is used in the functional layer in order to improve the stonechip adhesion, and this again impacts negatively on the adhesion after moisture exposure.

Application EP 1954771 uses what it calls "hyperbranched acrylate resins" to ensure the required physical drying between the surfacer and the basecoat after application. These resins entail a highly branched, caprolactone-modified acrylate polymer which partially still contains hydroxyl and/or carboxyl monomers which have a molecular weight of between 10 000 and 150 000 Da. In order to attain the desired technological and performance properties, binder fractions of between 40% to 95% by weight, based on total binder, must be used. However, the use of these high fractions of acrylate resin in the functional layer does not lead to effective stonechip adhesion in all cases. Particularly in the case of highly pigmented shades such as white and red, the adhesion results may be poor.

Application WO 2006/062666 describes a primerless coating procedure. The basecoat functional layer described in that specification is impermeable to UV radiation. The UV-stable constituents in the functional layer are composed of a combination of at least two components consisting of titanium dioxide, carbon black, iron oxide pigments and/or aluminum pigments. The resultant functional layer, in a thickness of 15 µm, produces a UV transmittance in which less than 0.5% of the UV light passes through the basecoat. The aforementioned functional layers are acrylate-based and therefore the level of stonechip protection they afford is less than that of a conventional primer-surfacer coat.

Patent application EP-A-0893483 describes a 3C1B functional layer for the painting of light-sensitive OEM components for installation in or on vehicles. The functional layer comprises a very high fraction of carbon black. This is made possible through the use of dispersing additives, an organic pigment synergist, and a UV absorber. By means of this combination, sufficient UV resistance is said to be ensured at film thicknesses of 2.5 to 5 µm. Moreover, the functional layer is further composed of a microgel, a melamine resin-based crosslinker, and an OH carrier based on polyester and/or polyether. A disadvantage of the coating materials known from EP-A-0893483, however, is that the resulting coatings can be used only as anthracite primers, since otherwise the required UV stability is not ensured. Particularly in the case of poorly hiding shades, however, this has a great effect on the shade of the basecoat layers. Moreover, the polyethers generally exhibit poor adhesion results after moisture exposure.

The problem addressed by the present invention was therefore that of providing a composition which forms functional layers functioning as coating material in multicoat paint systems with at least three coats without intermediate drying (3C1B multicoat paint systems) and does not have the disadvantages of the prior art. Said functional layer ought to replace the primer-surfacer coat of prior-art 3C1B multicoat paint systems.

The resultant multicoat paint system ought to have outstanding intercoat adhesion and also high stonechip resistance, particularly under extreme condensation conditions. The multicoat paint system ought likewise to exhibit a high level of glazing bond adhesion.

Intercoat adhesion means the adhesion between the individual layers (for example, CEC to functional layer, functional layer to basecoat, basecoat to clearcoat), which can lead to faults as a result of exposures such as stonechipping, cross-cutting, etc.

Furthermore, the compositions ought to be applied as a functional layer coating in a wet-on-wet-on-wet operation. In the context of this operation, however, the advantages achieved through the known functional layers and the multicoat paint systems produced from them ought not to be lost, but instead ought to be at least retained in the same extent and preferably to a greater extent.

In a 3C1B system, therefore, the corresponding functional layer coatings ought to exhibit in particular a good haze, i.e., no haze, good leveling, and also a very good overall visual appearance. In addition the basecoats ought to be free from film defects such as mud cracking and runs, for example.

Finally, a method ought to be made available for improving the UV absorption and the technological properties of functional layer coatings, especially in the 3C1B process.

Furthermore, it ought also to be possible to use the functional layer in 2C1B processes.

SUMMARY OF THE INVENTION

Compositions have been found, surprisingly, which do not have the disadvantages of the prior art. Instead, compositions have been found which in 3C1B multicoat paint systems form a functional layer coating which exhibits particularly good intercoat adhesion, high stonechip resistance, and a high level of glazing bond adhesion. A particular surprise was that the compositions of the invention produced multicoat paint systems of the invention which, under extremely high atmospheric humidity and temperatures, with subsequent cold loading, exhibit high glazing bond adhesion and also, at the same time, a good stonechip resistance, in particular. Lastly, the multicoat paint systems of the invention meet the technological and performance requirements that are typically imposed on an automotive finish.

Furthermore, the functional layer can also be used in 2C1B processes.

The composition comprises
  a. at least one saturated or unsaturated, epoxy-modified polyester as binder,
  b. at least one acrylate polymer or polyurethane polymer as further binder,
  c. polymer microparticles,
  d. at least one polymer comprising functional groups consisting of blocked isocyanates and amino resins, as crosslinking agent,
  e. at least one pigment,
  f. at least one organic solvent, and
  g. at least one auxiliary or additive,
the solids of the composition being at least 50% by weight, and the composition being water-free.

Compositions having a solids fraction of 50% by weight or more are referred to as high-solids compositions. Corresponding coating materials are called high-solids coating materials.

Water-free compositions are compositions which are free or substantially free from water. The water fraction is preferably less than 1% by weight, based on the total weight of the composition.

The solids content of the composition and of its constituents is ascertained in accordance with DIN ISO 3251, with an initial mass of 1.0 g, for a test duration of 60 minutes at a temperature of 125° C.

The composition preferably comprises 5% to 20% by weight of epoxy-modified polyesters, based on the total weight of the composition. The parts by weight of all of the constituents of the composition add up to 100% by weight.

In one particularly preferred embodiment the composition of the invention comprises
  a. 5% to 20% by weight of at least one saturated or unsaturated, epoxy-modified polyester as binder,
  b. 5% to 30% by weight of at least one acrylate polymer or polyurethane polymer as further binder,
  c. 5% to 20% by weight of polymer microparticles,
  d. 5% to 15% by weight of at least one polymer which comprises functional groups consisting of blocked isocyanates and amino resins, as crosslinking agent,
  e. 5% to 49.5% by weight of at least one pigment,
  f. 30% to 50% by weight of at least one organic solvent, and
  g. 0.5% to 40% by weight of at least one auxiliary or additive, based in each case on the total weight of the composition.

DETAILED DESCRIPTION OF AN EMBODIMENT OF THE INVENTION

Epoxy-Modified Polyester Binders (PE)

Epoxy-modified polyester binders (PE) are polyester resins modified with units containing glycidyl ester.

The composition of the invention comprises preferably 7% to 18% by weight, more preferably 9% to 15% by weight, based in each case on the total weight of the composition, of at least one epoxy-modified polyester binder (PE).

The epoxy-modified polyester binder preferably has an acid number of 2 to 40 mg KOH/g, more preferably 5 to 20 KOH/g, based in each case on the solids. The acid number is determined in accordance with DIN 53402.

The hydroxyl number is preferably 50 to 250 mg KOH/g, more preferably 80 to 200 KOH/g, based in each case on the solids. The hydroxyl number is determined in accordance with DIN 53240.

The epoxy-modified polyester binder preferably has a solids content of 40% to 90% by weight, more preferably of 50% to 80% by weight.

Suitable epoxy-modified polyester resins (PE) may be saturated or unsaturated, especially saturated. Unsaturated polyester resins are those which contain a polymerizable carbon-carbon double bond. Saturated polyester resins are those which contain no polymerizable carbon-carbon double bond.

The epoxy-modified polyester binders (PE) preferably have a weight-average molecular weight of 5000 to 20 000 g/mol. Preferred epoxy-modified polyester binders have a weight-average molecular weight of 7000 to 18 000 g/mol, more preferably 9000 to 16 000 g/mol. The molecular weight is determined by GPC analysis with THF (+0.1% by weight of acetic acid, based on the weight of THF) as eluent (1 ml/min) on a styrene-divinylbenzene column combination. The calibration is performed using polystyrene standards.

Polyester resins (PE) are prepared by esterifying organic dicarboxylic acids or their anhydrides with organic diols, or derive from a hydroxycarboxylic acid or a lactone. To prepare branched polyester polyols, use may additionally be made, to a minor extent, of polyols or polycarboxylic acids having a functionality of more than 2. The dicarboxylic and/or polycarboxylic acids and diols and/or polyols may be linear or branched, aliphatic, cycloaliphatic or aromatic dicarboxylic and/or polycarboxylic acids or diols and/or polyols.

Examples of diols suitable for preparing the polyester resins include alkylene glycols, such as ethylene glycol, propylene glycol, butylene glycol, butane-1,4-diol, hexane-1,6-diol, neopentylglycol, and other diols, such as dimethylolcyclohexane. It is, though, also possible to add small amounts—up to 10% by weight, based on the total weight of polyols and diols—of polyols, such as trimethylolpropane, glycerol, and pentaerythritol, for example. The acid component of the polyester is composed primarily of low molecular mass dicarboxylic acids or their anhydrides having 2 to 44, preferably 4 to 36, carbon atoms in the molecule. Examples of suitable acids include o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. In place of these acids it is also possible to use their anhydrides, where they exist. In forming polyester polyols it is also possible to use relatively small amounts of carboxylic acids having 3 or more carboxyl groups, examples being trimellitic anhydride or the adduct of maleic anhydride with unsaturated fatty acids.

As diols it is also possible to use polyester diols which are obtained by reacting a lactone with a dihydric alcohol. They are distinguished by the presence of terminal hydroxyl groups and repeating polyester fractions of the formula (—CO—(CHR$^2$)$_n$—CH$_2$—O). In this formula, n is preferably 4 to 12 and the substituent R$^2$ independently at each occurrence is hydrogen or an alkyl, cycloalkyl or alkoxy radical. Preferably no one of the substituents R$^2$ contains more than 12 carbon atoms. Examples are hydroxycaproic acid, hydroxybutyric acid, hydroxydecanoic acid and/or 12-hydroxydecanoic acid.

Preferred for the preparation of the polyester diols is the unsubstituted epsilon-caprolactone, in which n has a value of 4 and all of the R$^2$ substituents are hydrogen. The reaction with lactone is initiated by low molecular mass polyols such as ethylene glycol, 1,3-propanediol, 1,4-butanediol, and dimethylolcyclohexane. It is also possible, though, for other reaction components such as alkyldiamines (for example, ethylenediamine, triethylenediamine, trimethylhexamethylenediamine, hexamethylenediamine), alkyldialkanolamines or else urea compounds such as ethyleneurea or N,N'-dimethylurea to be reacted with caprolactone. Other suitable diols of relatively high molecular mass include polylactam diols, which are prepared by reacting, for example, epsilon-caprolactam with low molecular mass diols.

Preferred for the epoxy modification of the polyesters is the glycidyl ester of a saturated monocarboxylic acid. It is preferred to use the glycidyl ester of an alpha-branched monocarboxylic acid having 5 to 18 C atoms per molecule; particular preference is given to using the glycidyl ester of Versatic® acid from Shell. This glycidyl ester is available commercially under the name "Cardura E10".

The epoxy-modified polyester binders (PE) used in the coating materials of the invention preferably have an epoxy group content of 5% to 15% by weight, more preferably 7% to 13% by weight, based in each case on the total weight of the polyester binders.

Further Binders (BM)

The composition of the invention comprises at least one acrylate polymer or polyurethane polymer as further binder (BM). The further binder is present preferably with a fraction of 5% to 30% by weight in the composition of the invention, based on the total weight of the composition.

The composition of the invention comprises preferably 10% to 25% by weight, more preferably 12% to 23% by weight, of at least one further binder (BM), based in each case on the total weight of the composition.

Suitable acrylate binders (AC) are described comprehensively in German patent application DE 2006053776 A1, page 23 line 10 to page 26 line 2.

Suitable polyurethane binders (PUR) are described comprehensively in German patent application DE 2006053776 A1, page 26 line 4 to page 28 line 30.

Polymer Microparticles (M)

The compositions of the invention comprise polymer microparticles. There are preferably 5.0% to 20.0% by weight present, more preferably 8.0% to 15.0% by weight, based in each case on the total weight of the composition.

Polymer microparticles in the compositions of the invention are advantageous since they allow mixing between the individual layers to be prevented.

Suitable polymer microparticles are described in, for example, EP-A-480 959, page 3 line 36 to page 4 line 35, WO 96/24619, WO 99/42529, EP-B-1 173 491, EP-B-1 185 568, WO 03/089487, WO 03/089477, WO 01/72909, and WO 99/42531. The polymer microparticles may be used in particular for controlling the level, the standing capacity, the evaporation behavior, and the dissolution behavior by the basecoat.

Suitable polymer microparticles typically have a weight-average molecular weight of 2000 to 100 000. The molecular weight is determined by means of GPC analysis with THF (+0.1% by weight of acetic acid, based on the THF weight) as eluent (1 ml/min) on a styrene-divinylbenzene column combination. Calibration is performed using polystyrene standards.

Suitable polymer microparticles preferably have an average particle size of 0.01 to 10 µm, more preferably of 0.01 to 5 µm, and with particular preference of 0.02 to 2 µm in accordance with ISO 13320-1.

Polymer microparticles used with particular preference contain reactive functional groups which are able to react with the functional groups of the crosslinking agent. In particular the polymer microparticles in this case contain hydroxyl groups. The polymer microparticles then have a hydroxyl number, preferably, of 5 to 150 mg KOH/g in accordance with DIN 53240. Hydroxyl-containing polymer microparticles are described in WO 01/72909, for example.

Crosslinked polymer microparticles are obtainable for example by subjecting a mixture of:

(a) ethylenically unsaturated monomers which contain a single ethylenically unsaturated group per molecule, or a mixture of such monomers, and (b) ethylenically unsaturated monomers which contain at least two ethylenically unsaturated groups per molecule, or a mixture of such monomers, to polymerization in an aqueous phase, optionally in the presence of emulsifiers or optionally in the presence of a support resin, and subsequently transferring the aqueous polymer microparticle dispersion thus obtained into an organic solvent or a mixture of organic solvents.

Preferred polymer microparticles are those prepared using components comprising ionic and/or polar groups, preferably hydroxyl groups and/or carboxyl groups. The components (a) and (b) ought in general each to contain between 1% and 20%, preferably between 3% and 15% by weight of ionic and/or polar groups, based on the total weight of the polymer microparticles.

In order to obtain sufficiently crosslinked polymer microparticles it is generally sufficient to use, to one mole of component (a), 0.25 to 1.2 mol, preferably 0.3 to 1 mol, of component (b).

The polymer microparticles (M) used in the compositions of the invention may alternatively be prepared directly in organic phase.

Polymer microparticles used with preference are obtainable for example by subjecting a mixture of:

(c) an ethylenically unsaturated monomer (M1) which contains at least one reactive group (G1) per molecule, or a mixture of such monomers (M1), and (d) optionally an ethylenically unsaturated monomer (M2) which contains at least one reactive group (G2), different from (G1), per molecule, or a mixture of such monomers (M2), and (e) optionally a further ethylenically unsaturated monomer (M3) or a mixture of such monomers (M3)

to polymerization in an organic solvent, optionally in the presence of a support resin.

Examples of suitable monomers (M1) are monomers which contain hydroxyl groups, carbamate groups, amino groups, alkoxymethylamino groups, allophanate groups or imino groups, especially hydroxyl groups.

The monomers (M1) having the reactive groups (G1) may also be prepared by reacting two compounds, of which one compound (a) contains a reactive group (a) and at least one ethylenically unsaturated double bond, and the other compound contains at least one ethylenically unsaturated double bond.

Examples of suitable monomers (M2) are monomers containing carboxyl groups.

Suitable monomers (M3) are the monomers that are typically employed and are referred to as neutral monomers, in other words ethylenically unsaturated monomers which comprise at least two ethylenically unsaturated groups per molecule or comprise a mixture of such monomers.

Crosslinking Agents (V)

The composition of the invention comprises preferably 5% to 15% by weight, based on the total weight of the composition, of at least one polymer selected from the group consisting of blocked isocyanates and amino resins.

The composition of the invention preferably comprises 20% to 25% by weight of amino resins and 0% to 10% by weight of blocked isocyanates, based in each case on the total binder solids. 21% to 24% by weight of amino resins is preferred. Likewise preferred is 2% to 6% by weight of blocked isocyanates. With particular preference the composition of the invention comprises 21% to 24% by weight of amino resins and 2% to 6% by weight of blocked isocyanates.

Blocked isocyanates contemplated are the blocked isocyanates that are typically employed in the coatings industry segment, such as hexamethylene diisocyanate (HDI), isophorone diisocyanate (IPDI), tolylene diisocyanate (TDI), the dimers and trimers of these, and also derivatives and blocked variants, for example.

Blocked isocyanates may be obtained from isocyanates by reaction with a blocking agent. Blocking agents suitable for isocyanates include all customarily employed blocking agents, such as the corresponding alcohols, amines, ketones, pyrazoles, and others, preferably blocking agents having a deblocking temperature of below 130° C. It is preferred to use dimethylpyrazole-blocked isocyanates, more particularly Desmodur® PL 350 SN and Desmodur® VP LS 2253 from Bayer.

Suitable amino resins are in principle the amino resins typically employed in the coatings industry segment, some properties of the functional layer being controllable via the reactivity of the amino resins. The more reactive the crosslinking agent, the poorer the leveling of the paint system and the storage stability of the coating material. Leveling and storage stability can be influenced, for example, via the degree of etherification and the alcohol used for the etherification. Examples of suitable alcohols include methanol and butanol. Monomeric crosslinking resins can be used, such as hexa(methoxymethyl)melamine (HMMM), or melamines with mixed etherification, or else polymeric crosslinking resins. Preference is given to using amino resins etherified with methanol and/or butanol, examples being the products available commercially under the names Cymel®, Resimene®, Maprenal®, and Luwipal®, more particularly Resimene®747 and Resimene®755 from Ineos Melamines.

Advantageously there are no unblocked isocyanates present as crosslinking agents, since they lead to an unwanted increase in viscosity.

Pigments (P)

The composition of the invention comprises preferably 5% to 49.5% by weight, based on the total weight of the composition, of at least one pigment (P). Preferred compositions are those comprising 8% to 40% by weight of pigments.

Pigments are colorants in powder or flake form which, in contrast to dyes, are insoluble in the surrounding medium (cf. Römpp Lacke und Druckfarben, page 451, entry heading "Pigments").

The pigment is preferably selected from the group consisting of organic and inorganic color, effect, color and effect, magnetically shielding, electrically conductive, anticorrosion, fluorescent, and phosphorescent pigments. Preference is given to using the color and/or effect pigments.

With particular preference the composition comprises at least one effect pigment, more particularly at least one metal flake pigment. Together with the effect pigment or pigments, the composition optionally further comprises at least one or more color pigments.

Examples of suitable effect pigments, which may also impart color, are metal flake pigments, such as commercial aluminum bronzes and commercial stainless steel bronzes, and nonmetallic effect pigments, such as pearlescent pigments and interference pigments, for example, platelet-like effect pigments based on iron oxide, or liquid-crystalline effect pigments. For further details refer to Römpp Lexikon Lacke und Druckfarben, page 176, entry heading "Effect pigments" and pages 380 and 381, entry headings "Metal oxide-mica pigments" to "Metal pigments".

Use is made more particularly of commercial aluminum bronzes. The types used include both untreated types, available commercially under the name Stapa® Metallux from Eckart, for example, and treated types, more particularly silanized types, which are described, for example, in WO 01/81483 and are available commercially under the name Hydrolan® from Eckart.

The metal flake pigment preferably has a thickness of 200 to 2000 nm and more particularly 500 to 1500 nm. This determination is carried out using a Leica DM-RX, light microscope at 500-1000 times magnification.

The metal flake pigment preferably has an average particle size of 10 to 50 and more particularly of 13 to 25 μm (ISO 13320-1 according to Cilas (instrument 1064)).

Suitable organic and/or inorganic color pigments are the pigments typically used in the coatings industry.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

The composition of the invention comprises preferably 0.01% to 50.0% by weight of inorganic color pigments, based on the total weight of the composition. Where black pigments are used, their fraction in the composition of the invention is preferably 0.6% to 30.0% by weight, based on the total weight of the composition.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, refer to Römpp Lexikon Lacke and Druckfarben, Georg Thieme Verlag, 1998, pages 180 and 181, entry headings "Iron blue pigments" to "Black iron oxide", pages 451 to 453, entry headings "Pigments" to "Pigment volume concentration", page 563, entry heading "Thioindigo pigments", page 567, entry heading "Titanium dioxide pigments", pages 400 and 467, entry heading "Naturally occurring pigments", page 459, entry heading "Polycyclic pigments", page 52, entry headings "Azomethine pigments", "Azo pigments", and page 379, entry heading "Metal complex pigments".

The amount of the pigments may vary very widely and is guided primarily by the depth of color that is to be set, and also by the dispersibility of the pigments in the functional layer, and the UV permeability.

Organic Solvents (L)

The composition of the invention comprises preferably 30% to 50% by weight, based on the total weight of the composition, of at least one organic solvent (L).

The composition of the invention comprises preferably 35% to 45% by weight, more preferably 38% to 45% by weight, based in each case on the total weight of the composition, of at least one organic solvent (L).

Suitable organic solvents (L) are all solvents which are typically used in the coatings industry, examples being alcohols, glycol ethers, esters, ether esters, and ketones, aliphatic and/or aromatic hydrocarbons, such as, for example, acetone, methyl isobutyl ketone, methyl ethyl ketone, butyl acetate, 3-butoxy-2-propanol, ethyl ethoxypropionate, butylglycol, butylglycol acetate, butanol, dipropylene glycol methyl ether, butyl glycolate, xylene, toluene, aliphatic hydrocarbons such as Shellsol T (aliphatic hydrocarbons from Shell), Pine Oil 90/95 (aromatic hydrocarbons), Solventnaphtha® (aromatic hydrocarbons from ExxonMobil), Shellsol® A (aromatic hydrocarbons from Shell), Solvesso (aromatic hydrocarbons from ExxonMobil), mineral spirit 135/180 (aromatic hydrocarbons from BP), and the like.

Through the amount of organic solvent (L) it is possible to influence the viscosity of the composition, and it is preferred to adjust the spray viscosity in this way. The spray viscosity is the viscosity to which a coating material is adjusted by addition of solvent prior to spray application (Römpp Lacke and Druckfarben, page 537, entry heading "Spray viscosity"). The amount of organic solvent (L) is preferably chosen such that the functional layer of the invention has a viscosity at 23° C. of 24 s to 30 s, preferably 26 to 28 s, flow time in the Ford 4 Cup.

The amount of organic solvent (L) in the composition of the invention is always selected such that the composition has a solids content of at least 50% by weight. The solids content of the composition of the invention is preferably at least 51% by weight, more preferably 52% by weight. The solids content of the functional layer is determined in a method based on DIN ISO 3251 with an initial mass of 1.0 g for a test duration of 60 minutes at a temperature of 125° C.

Auxiliaries and Additives (Z)

The composition of the invention comprises preferably 0.5% to 40% by weight, based on the total weight of the composition, of at least one auxiliary or additive (Z).

The composition of the invention comprises preferably 1% to 35% by weight, more preferably 1.5% to 30% by weight, based in each case on the total weight of the composition, of at least one auxiliary or additive (Z).

Suitable auxiliaries or additives (Z) are the known auxiliaries and additives used typically in the coatings industry. Examples of suitable auxiliaries and additives are organic and inorganic fillers, e.g., talc, and/or dyes (organic, black or chromatic substances which are soluble in the surrounding medium (cf. Römpp Lacke and Druckfarben, page 221, entry heading "Colorants")), and also further customary auxiliaries and additives, such as, for example, antioxidants, deaerating agents, wetting agents, dispersants, emulsifiers, rheological assistants such as flow control agents, thickeners, antisag agents, and thixotropic agents, waxes and waxlike compounds, slip additives, reactive diluents, free-flow aids, siccatives, biocides, substrate wetting enhancer additives, surface smoothness enhancer additives, matting agents, free-radical scavengers, light stabilizers, preferably UV absorbers having an absorption maximum below 370 nm, and/or sterically hindered amines (HALS), corrosion inhibitors, flame retardants or polymerization inhibitors, as described in detail in the book "Lackadditive" [Additives for coatings] by Johan Bieleman, Wiley-VCH, Weinheim, N.Y., 1998. Preferred auxiliaries and additives are rheological assistants, deaerating agents, wetting agents, dispersants, UV absorbers, and free-radical scavengers. Particularly preferred auxiliaries and additives are UV absorbers, wetting agents, and rheological assistants.

Preferably there is no talc present. Compositions comprising talc display a deterioration in adhesion after moisture exposure.

FURTHER SUBJECT MATTER OF THE INVENTION

The present invention further provides a method of producing the composition of the invention. In this method the composition may be prepared by mixing and homogenizing the constituents.

The present invention further provides for the use of the composition as a coating material. The coating material is used preferably for producing a functional layer in multicoat paint systems, the multicoat paint systems comprising
  a. at least one functional layer A, obtained from the composition of the invention,
  b. at least one basecoat B of at least one basecoat material, and
  c. at least one clearcoat C of at least one clearcoat material.

Preference is given to applying, in succession, first A, then B, and finally C to a substrate, and then jointly curing A, B, and C (3C1B process), or first A is applied to a substrate and cured, thereafter B, and finally C are applied to the substrate, and B and C are then jointly cured (2C1B process). Preference is given to use for producing a functional layer in multicoat paint systems which are obtained by the 3C1B process.

The invention further provides a multicoat paint system composed of
  a. at least one functional layer A, obtained from the composition of the invention,
  b. at least one basecoat B of at least one basecoat material, and
  c. at least one clearcoat C of at least one clearcoat material.

The multicoat paint system of the invention is preferably obtainable by the 2C1B or 3C1B process. More preferably the multicoat paint system of the invention is obtainable by the 3C1B process.

The multicoat paint systems of the invention are composed preferably of precisely one functional layer, precisely one basecoat, and precisely one clearcoat. For this purpose, with particular preference, precisely one composition of the invention is used for the functional layer, precisely one basecoat material for the basecoat, and precisely one clearcoat material for the clearcoat.

The multicoat paint systems of the invention may be applied to any desired substrates. The substrates may be composed of any of a very wide variety of materials and combinations of materials. Preferably they are composed of metals, plastics and/or glass, more preferably of metal and/or plastic.

The substrates are typically provided with a primer and where appropriate with a flash primer, applied by the customary methods, such as electrodeposition, dipping, knifecoating, spraying and/or rolling. The primer is preferably at least partly or fully cured before the composition of the invention is applied. The primer or surfacer is cured typically by heating to a temperature of between 80 and 170° C. for a time of 3 to 30 minutes.

Suitable basecoat materials are all of the solventborne pigmented coating materials that are commonly used, such as, for example, medium-solids (solids fraction from 15% to 30% by weight) or high-solids (solids fraction at least 40% by weight) basecoat materials. The basecoat materials used may be curable thermally and/or by means of radiation, more particularly by means of UV radiation.

The basecoat materials typically comprise at least one binder having functional groups and also at least one crosslinker having a functionality which is complementary to the functional groups of the binder. Examples of such complementary functionalities are, in particular, (carboxyl/epoxy), (amine or thiol or hydroxyl/blocked or free isocyanate or alkoxylated amino groups or transesterifiable groups), ((meth)acryloyl/CH-acidic or amine or hydroxyl or thiol), (carbamate/alkoxylated amino groups), and ((meth)acryloyl/(meth)acryloyl).

Use is made in particular of basecoat materials based on polyurethane resins and/or polyacrylate resins and/or polyester resins, preferably with hydroxyl, amino, carbamate, carboxyl, (meth)acryloyl and/or thiol groups, in combination with the corresponding crosslinkers, especially in combination with isocyanates, amino resins and/or anhydrides.

Besides the binder and the crosslinker, the basecoat materials comprise typical auxiliaries and additives, such as, for example, crosslinking catalysts, defoamers, adhesion promoters, substrate wetting enhancer additives, rheological agents, waxes, flow control agents, light stabilizers, preferably the above-described UV absorbers having an absorption maximum below 370 nm and/or HALS, corrosion inhibitors, biocides, flame retardants or polymerization inhibitors, as described in detail in the book "Lackadditive" [Additives for coatings] by Johan Bieleman, Wiley-VCH, Weinheim, N.Y., 1998. Suitable pigmented coating materials are described for example in German patent application DE-A-2006053776.

The basecoat materials may comprise polymer microparticles. This allows better flop behavior to be achieved.

Suitable clearcoat materials of the multicoat paint system of the invention are all transparent coating materials that are commonly employed, such as, for example, commonly employed aqueous or solventborne transparent coating materials, which may be formulated either as one-component or else as two-component or multicomponent coating materials. Also suitable, furthermore, are powder slurry clearcoats. The transparent coating materials (clearcoat materials) preferably have a solids fraction of at least 40% by weight. The transparent coating materials used may be curable thermally and/or by means of radiation, more particularly by means of UV radiation.

The transparent coating materials typically comprise at least one binder having functional groups and also at least one crosslinker having a functionality which is complementary to the functional groups of the binder. Examples of such complementary functionalities are, more particularly, the following duos, each complementary to one another: (carboxyl/epoxy), (amine or thiol or hydroxyl/blocked or free isocyanate or alkoxylated amino groups or transesterifiable groups), ((meth)acryloyl/CH-acidic or amine or hydroxyl or thiol), (carbamate/alkoxylated amino groups), and ((meth)acryloyl/(meth)acryloyl).

Use is made in particular of transparent coating materials based on polyurethane resins and/or polyacrylate resins and/or polyester resins, preferably with hydroxyl, amino, carbamate, carboxyl, (meth)acryloyl and/or thiol groups, in combination with the corresponding crosslinkers, more particularly in combination with isocyanates, amino resins and/or anhydrides.

Besides the binder and the crosslinker, the transparent coating materials comprise typical auxiliaries and additives, such as, for example, crosslinking catalysts, defoamers, adhesion promoters, substrate wetting enhancer additives, surface smoothness enhancer additives, matting agents, light stabilizers, preferably UV absorbers having an absorption maximum below 370 nm and/or HALS, corrosion inhibitors, biocides, flame retardants or polymerization inhibitors, as described in detail in the book "Lackadditive" [Additives for coatings] by Johan Bieleman, Wiley-VCH, Weinheim, N.Y., 1998.

Suitable transparent coating materials are described for example in WO 03/050194 A1, in US 2008/076868 A1, and in WO 06/063304 A1.

The functional layer A of the multicoat paint system of the invention preferably has a dry film thickness of 5 to 40 µm, more preferably of 10 to 30 µm, with particular preference of 15 to 25 µm, and very preferably 18 to 25 µm.

The dry film thickness of the basecoat B is preferably 5 to 40 µm, more preferably 10 to 30 µm, with particular preference from 15 to 25 µm, and very preferably 18 to 25 µm.

The clearcoat C preferably has a dry film thickness of 10 to 120 µm, more preferably of 30 to 80 µm, and more particularly of 40 to 70 µm.

The present invention further provides a method of producing the multicoat paint system of the invention. The composition of the invention is applied to a substrate. The substrate has preferably been primed. Subsequently at least one basecoat material and then at least one clearcoat material are applied. Preferably, the composition and also the basecoats and clearcoats are jointly cured (3C1B process), or the composition is applied first and cured and then basecoat and clearcoat are applied and jointly cured (2C1B process). It is particularly preferred for the composition and also the basecoats and clearcoats to be jointly cured.

The basecoat material and the clearcoat material, like the composition of the invention, are applied by means of customary methods for the application of liquid coating materials, such as, for example, dipping, knifecoating, spraying, and rolling, but more particularly by means of spraying. Preference is given to employing spray application methods, such as compressed-air spraying, airless spraying, high-speed rotation and electrostatic spray application (ESTA), for example, where appropriate in conjunction with hot spray application such as hot air spraying, for example. It is particularly advantageous to apply the basecoat by ESTA in a first application and pneumatically in a second application.

In the 3C1B process, the composition of the invention, following application, is flashed or dried, preferably at a temperature between 30 and less than 100° C. for a time of 1 to 15 minutes. Thereafter the basecoat is applied and is also briefly flashed or briefly dried, preferably at a temperature between 30 and less than 100° C. for a time of 1 to 15 minutes. Subsequently the transparent coating material is applied.

The applied composition of the invention (wet functional layer), the applied basecoat (wet basecoat) and the applied clearcoat (wet clearcoat) are preferably cured at least thermally. Where the clearcoat is also curable with actinic radiation as well, an aftercure takes place by irradiation with actinic radiation. The curing may take place after a certain rest time. This time may have a duration of 30 seconds to 2 hours, preferably 1 minute to 1 hour, and more particularly 1 to 45 minutes. The rest time serves, for example, for the flow and for the degassing of the coating films, or for the evaporation of volatile constituents. The rest time may be assisted and/or shortened through the application of elevated temperatures of up to 90° C. and/or through a reduced atmospheric humidity (<10 g of water/kg of air), provided this does not entail any damage to or change in the coating films, such as premature complete crosslinking, for instance.

Curing takes place typically at a temperature between 90 and 160° C. for a time of 15 to 90 minutes.

For the drying and/or conditioning of the wet functional layer, the wet basecoat, and the wet clearcoat, it is preferred to use thermal and/or convection techniques, with use of customary and known apparatus such as through-type ovens, radiant IR and NIR heaters, blowers, and blowing tunnels. These types of apparatus can also be combined with one another.

The procedure in the 2C1B process is similar, with the difference that the composition is first applied, dried, and cured. After that, basecoat and clearcoat are applied, dried, and cured, using the methods specified above.

The invention further provides for the use of the multicoat paint systems of the invention for coating substrates. The substrates in question are preferably those indicated above.

The multicoat paint systems of the invention are used in particular in the sector of automotive OEM finishing, but also in the sectors of utility vehicle finishing and automotive refinish, where they are used for the coating of vehicle bodies or of interior bodywork components or exterior bodywork components. They are, however, also suitable for other segments, such as, for example, for the coating of components for watercraft and aircraft, or of components for household appliances and electrical appliances, or parts thereof.

The invention further provides substrates coated with the composition of the invention. The composition of the invention preferably forms the functional layer of a multicoat paint system.

The invention additionally provides substrates coated with the multicoat paint system of the invention.

The invention is illustrated below with reference to examples.

EXAMPLES

Percentages below are to be interpreted as percentages by weight.

1. Preparation of an Epoxy-Modified Polyester Binder (E-PE)

Weighed out into a 2 l four-necked flask with stirrer, electrical resistance heating, thermometer, column packed with Pall rings, and equipped with overhead thermometer, distillation bridge, condensate condenser, and receiver, are 81.0 parts by weight of 1,6-hexanediol, 108.0 parts by weight of neopentyl glycol, 28.0 parts by weight of glycerol, 38.0 parts by weight of trimethylolpropane, 99.0 parts by weight of adipic acid, 157.0 parts by weight of phthalic anhydride, and 125.0 parts by weight of isophthalic acid. The reaction mixture, with stirring, is heated rapidly to 160° C. and held at 160° C. for 30 minutes. From 160° C., the temperature is increased over the course of 1.5 hours to 190° C. at a rate such that the column overhead temperature does not exceed 103° C. The batch is then cooled to 150° C., 63.0 parts by weight of Cardura E 10 P and 7.0 parts by weight of xylene are added, after which heating is carried out, and the batch is maintained at 165° C. for an hour. It is then heated to 230° C. and held at 230° C. until the acid number is below a level of 10 mg KOH/g. The epoxy-modified polyester is cooled further and dissolved with a mixture of 238.0 parts by weight of Solventnaphtha 155/185, 24.0 parts by weight of 1-methoxypropyl acetate, and 35.0 parts by weight of ethyl ethoxypropionate.

This gives a 65% strength binder solution.

The resulting epoxy-modified polyester (E-PE) has an acid number of 8 mg KOH/g to DIN 53402 and an OH number of 102 mg KOH/g to DIN 53240, based in each case on the solids. The solids of the polyester is 65% by weight. The weight-average molecular weight is 14 500 g/mol. The fraction of epoxy groups in the polyester is 10% by weight, based on the total weight of the polyester.

2. Preparation of a Polyester Without Epoxy Modification (PE)

In a reactor, a mixture of 29.1 parts by weight of dimer fatty acid, 28.5 parts by weight of 1,6-hexanediol, 8.4 parts by weight of isophthalic acid, and 1.2 parts by weight of toluene is heated slowly to 154° C. under a nitrogen atmosphere. This mixture is subsequently heated over the course of 40 minutes to 193° C. The course of the reaction is monitored by means of a water separator. When an acid number of 10 mg KOH/g is reached, the reaction mixture is cooled to 149° C. Then 11.2 parts by weight of trimellitic anhydride are added slowly, using a dropping funnel.

Following complete addition of the trimellitic anhydride, the batch is heated to 166° C. The course of the reaction is monitored by determination of the acid number. When an acid number of 32 mg KOH/g is reached, the reactor is cooled to 107° C. and a mixture of 10.9 parts by weight of n-butanol, 9.6 parts by weight of n-propoxypropanol, and 0.01 part by weight of dimethanolamine is added slowly, using a dropping funnel. After cooling to 49° C., the solids is adjusted to 73.0% by addition of 1.2 parts by weight of n-butanol.

The resulting polyester resin without epoxy modification (PE) has an acid number of 31 mg KOH/g and an OH number of 422 mg KOH/g, based in each case on the solids. The weight-average molecular weight is 4511 g/mol.

3. Preparation of an Aerosil Paste

Weighed out into a laboratory mill with agitator mechanism (Getzmann Labormühle SL 25; grinding media: SAZ 0.6-0.8 mm; energy input: 100 Wh/kg) are 100.0 g of mill base, consisting of 40.0 parts by weight of the acrylate binder described in German patent application DE 2006053776 A1 in preparation example 1.1, page 17 section 156, 42.0 parts by weight of Solvesso 100, 8.0 parts by weight of butanol, 10.0 parts by weight of Aerosil R972 (commercial silica from Degussa), together with 200.0 parts by weight of quartz sand (grain size 0.7-1 mm), and grinding takes place with water cooling for 30 minutes. The quartz sand is then separated off.

4. Preparation of a Barium Sulfate Paste

Weighed out into a laboratory mill with agitator mechanism (see above) are 100.0 g of mill base, consisting of 19.5 parts by weight of the acrylate binder described in German patent application DE 2006053776 A1 in preparation example 1.1, page 17 section 156, 10.7 parts by weight of Solventnaphtha 160/180 (ExxonMobil), 0.6 part by weight of Bentone 34 (commercial rheology additive from Elementis Specialties), 0.2 part by weight of ethanol, 65.0 parts by weight of Blanc Fixe Micro (commercial barium sulfate from Sachtleben), and 4.0 parts by weight of butyl acetate, together with 200.0 parts by weight of quartz sand (grain size 0.7-1 mm), and grinding takes place with water cooling for 30 minutes. The quartz sand is then separated off.

5. Preparation of a White Paste

Weighed out into a laboratory mill with agitator mechanism (see above) are 800.0 g of mill base, consisting of 152.0 parts by weight of the acrylate binder described in German patent application DE 2006053776 A1 in preparation example 1.1, page 17 section 156, 33.6 parts by weight of pentyl propionate, 6.4 parts by weight of Bentone 34, and 528.0 parts by weight of TiPure® R902 (commercial titanium dioxide from DuPont de Nemours and Company), together with 1100.0 parts by weight of quartz sand (grain size 0.7-1 mm), and grinding takes place with water cooling for 30 minutes. The quartz sand is then separated off.

6. Preparation of a Black Paste

Weighed out into a laboratory mill with agitator mechanism (see above) are 800.0 g of mill base, consisting of 81.6 parts by weight of the acrylate binder described in German patent application DE 2006053776 A1 in preparation example 1.1, page 17 section 156, 44.8 parts by weight of pentyl propionate, 401.6 parts by weight of Solvesso 100, 136.8 parts by weight of a commercial dispersing additive, 15.2 parts by weight of a commercial pigment synergist, and 120.0 parts by weight of Monarch® 900 (commercial carbon black from Cabot Corp.), together with 1100.0 parts by weight of quartz sand (grain size 0.7-1 mm), and grinding takes place with water cooling for 30 minutes. The quartz sand is then separated off.

7. Preparation of a Slurry of an Aluminum Effect Pigment (A)

The slurry is prepared from 40.0 parts by weight of a commercial nonleafing aluminum effect pigment paste of cornflake type, having an average particle size of 11 μm (Alpate 88037 from Toyal), and 60.0 parts by weight of butyl acetate, with stirring.

8. Production of the Inventive and Comparative Functional Layers F-1 to F-4

The functional layers F-1 to F-4 are produced by mixing and homogenizing the following constituents (in % by weight):

TABLE 1

Production of inventive and comparative functional layers F-1 to F-4.

| | Comparative example | | Inventive example | |
|---|---|---|---|---|
| Designation | F-1 | F-2 | F-3 | F-4 |
| Microgel[1] | 8.5 | 8.5 | 8.5 | 8.5 |
| N-Ethyl-2-pyrrolidone | 0.8 | 0.8 | 0.8 | 0.8 |
| Aminomethylpropanol-95 (Angus Chemie) | 0.08 | 0.08 | 0.08 | 0.08 |
| Melamine resin[2] | 2.4 | 2.4 | 2.4 | 2 |
| Melamine resin[3] | 5.7 | 5.7 | 5.7 | 5 |
| UV absorber[4] | 1.1 | 1.1 | 1.1 | 1.1 |
| Hals[5] | 0.5 | 0.5 | 0.5 | 0.5 |
| Wetting additive[6] | 0.07 | 0.07 | 0.07 | 0.07 |
| Aerosil paste from preparation example 3 | 22.0 | 22.0 | 22.0 | 22.0 |
| Barium sulfate paste from preparation example 4 | 5.8 | 5.8 | 5.8 | 5.8 |
| White paste from preparation example 5 | 27.8 | 27.8 | 27.8 | 27.8 |
| Black paste from preparation example 6 | 0.35 | 0.35 | 0.35 | 0.35 |
| Acrylate binder[7] | 18.6 | 9.6 | 9.6 | 7 |
| Polyester from preparation example 2 | | 9.6 | | |
| Epoxy-PE from preparation example 1 | | | 10.4 | 10.4 |
| Isocyanate blocked with 3,5-dimethylpyrazole (DMP)[8] | | | | 4 |
| Catalyst[9] | 2.5 | 2.5 | 2.5 | 2.5 |
| Ethanol | 0.7 | 0.7 | 0.7 | 0.7 |

TABLE 1-continued

Production of inventive and comparative functional layers F-1 to F-4.

|  | Comparative example | | Inventive example | |
|---|---|---|---|---|
| Designation | F-1 | F-2 | F-3 | F-4 |
| Alu slurry from preparation example 7 | 0.5 | 0.5 | 0.5 | 0.5 |
| Butyl acetate | 2.6 | 2.0 | 1.2 | 0.9 |

Key to Table 1:
[1]Microgel from German patent application DE 2006053776 A1, preparation example 1.2/1.3, page 17 section 157/158
[2]Resimene 755 from Ineos Melamines
[3]Resimene 747 from Ineos Melamines
[4]Tinuvin 384-2, 95% methoxy-2-propyl acetate (MPA) from BASF SE
[5]Tinuvin 123 from BASF SE
[6]Lindron 22 from Lindau Chemicals
[7]Acrylate binder from German patent application DE 2006053776 A1, preparation example 1.1, page 17 section 156
[8]Desmodur PL 350, 75% 1-methoxy-2-propyl acetate (MPA)/Solvent Naphtha (SN) 160/180 from Bayer AG
[9]Nacure ® 5225, dodecylbenzylsulfonic acid (DDBSA), from King Industries, Inc.

F-1 and F-2 are the comparative functional layers with acrylate or with a mixture of acrylate binder and polyester. F-3 and F-4 are the inventive functional layers with epoxy-modified polyester, with F-4 comprising blocked isocyanates as additional crosslinkers.

The functional layers F-1 to F-4 were adjusted with butyl acetate to a spray viscosity of 27 seconds, Ford Cup 4 (FC4).

TABLE 2

Wet data of inventive and comparative functional layers F-1 to F-4.

|  | Comparative example | | Inventive example | |
|---|---|---|---|---|
| Wet data | F-1 | F-2 | F-3 | F-4 |
| Viscosity (without butyl acetate, FC4) | 38s | 36s | 35s | 37s |
| % BuAc for spray viscosity | 5% | 4% | 4% | 5% |
| Viscosity (after addition of butyl acetate, FC4) | 27s | 27s | 27s | 27s |
| Solids content in % by weight (after addition of BuAc) | 53.2 | 53.5 | 53.4 | 53.1 |

9. Production of the 3 Wet Finishes 3W-1 to 3W-4

For the testing of the technological properties, the functional layers F-1 to F-4 were applied with a dry film thickness of 23 μm to test panels, consisting of a steel substrate (bodywork panel) which had been coated with a customary and known, cathodically deposited and baked electrodeposition coating (Cathoguard® 500 from BASF Coatings, dry film thickness 20 μm); after 5 minutes of flashing at room temperature, a commercial silver high-solids basecoat (Color-Classic HS from BASF Coatings, dry film thickness 18 μm) was applied over the top. Then the first two coats were flashed for 5 minutes and a commercial high-solids 1K [1-component] clearcoat (UreGloss from BASF Coatings, dry film thickness 45 μm) was applied over the top. Thereafter the resulting 3C1B multicoat paint systems 3W-1 to 3W-4 were baked at a panel temperature of 140° C. for 20 minutes.

The intercoat adhesion of the resultant 3C1B multicoat paint systems 3W-1 to 3W-4 was tested by means of the cross-cut test in accordance with Ford Test Method BI 106-01. The rating scale for the Ford BI 106-01 cross-cut test spans a range of 0-10, with a rating >2 indicating a potential adhesion problem.

The stonechip resistance of the multicoat paint systems was tested in accordance with Ford Test Method BI 157-06. The rating scale for the Ford BI 157-06 stonechip test spans a range of 1-10, with a rating <4 pointing to deficient stonechip resistance.

Both the stonechip test and the cross-cut test were performed both before and after a 240 h constant condensation climate (CCC) test.

For the testing of the glazing bond adhesion before and after heat and humidity exposure in accordance with Ford specification WSK-M11-P57-A1, the test panels coated with the 3C1B multicoat paint systems 3W-1 to 3W-4 were stored for 24 hours at room temperature and then the glazing bonding compound Betaseal® 1858-1 (moisture-curing, isocyanate-based adhesive, available commercially from Dow Automotive) was applied in strips over the complete clearcoat layer of the 3C1B multicoat paint systems 3W-1 to 3W-4, in the longitudinal direction (approximately 3 mm thick, 10 mm wide). The adhesive is cured at 25° C. and 50% humidity for 72 hours.

Following complete curing of the adhesive, a quick knife test is carried out. For this purpose, sections are made at intervals of 12 mm, vertically with respect to the adhesive, and the cured adhesive is pulled manually in the longitudinal direction. If this results exclusively in cracking within the adhesive compound, the adhesive/multicoat paint system intercoat adhesion and hence also the glazing bond adhesion are assessed as sufficient. If there is adhesive/clearcoat delamination or a fracture within the multicoat paint system, then the glazing bond adhesion is no longer sufficient.

After the testing of the glazing bonding at room temperature, the 3C1B multicoat paint systems 3W-1 to 3W-4 are wrapped in hydrophilic cotton fabric (absorbent cotton from Hartmann, No. 110406/2) and stored at 100% humidity for 14 days at 70° C. and then for 2 hours at −20° C. and also again for 2 hours at 23° C. Thereafter the cotton fabric is removed and, over the course of 2 hours, the quick knife test described above is carried out on the exposed 3C1B multicoat paint systems 3W-1 to 3W-4. The rating scale for the glazing bonding test spans a range of 1-5, with a rating of 1 corresponding to complete delamination, and a rating of 5 corresponding to complete fracture within the glazing bonding compound. The addition of a "u" indicates the parting plane of the delamination; in this case the parting plane is located within the primer layer.

Table 3 summarizes the individual results.

TABLE 3

Test data for inventive and comparative systems 3W-1 to 3W-4.

|  | Comparative example | | Inventive example | |
|---|---|---|---|---|
| Test | 3W-1 | 3W-2 | 3W-3 | 3W-4 |
| Cross-cut | | | | |
| Before CCC | 0 | 0 | 0 | 0 |
| After 240 h 40° C. CCC | 0 | 0 | 0 | 0 |
| Stonechip adhesion | | | | |
| Before CCC | 5-6 | 6-7 | 7 | 7 |
| After 240 h 40° C. CCC | 5 | 5 | 7 | 7 |
| Glazing bonding | | | | |
| After 5 d room temperature | 5 | 5 | 5 | 5 |
| After 14 d heat/humidity | 1u | 1u | 5 | 5 |
| General properties | | | | |
| Leveling | good | good | good | good |
| Film defects | no | no | no | no |

The results compiled in Table 3 emphasize how the 3C1B multicoat paint systems of the invention, 3W-3 and 3W-4, exhibit excellent glazing bond adhesion; the excellent results after heat-and-humidity exposure are supported by the hydrophobic nature of the Versatic acid of the epoxy-modified polyesters. The comparative specimens, 3W-1 and 3W-2, show a fracture in the functional layer after the heat-and-humidity test. This is undesirable, since glazing bond adhesion is a safety-relevant subject. The Motor Vehicle Safety Standards (MVSS) require the adhesive to show complete adhesion to the windshield and to the multicoat paint system.

The noninventive 3C1B multicoat paint system 3W-1, whose functional layer does not contain a polyester binder, exhibits significantly poorer stonechip resistance. Using a polyester binder improves the stonechip: the 3C1B multicoat paint systems 3W-3 and 3W-4, with epoxy-modified polyester, gave outstanding stonechip resistance, even after moisture exposure.

What is claimed is:

1. A water-free coating composition comprising:
   a. a binder comprising at least one saturated or unsaturated, epoxy-modified polyester;
   b. a further binder comprising at least on acrylate polymer or polyurethane polymer;
   c. polymer microparticles;
   d. a crosslinking agent comprising at least one polymer comprising functional groups selected from the group consisting of blocked isocyanates and amino resins;
   e. at least one pigment;
   f. at least one organic solvent; and
   g. at least one auxiliary additive;
   wherein the solids of the composition are at least 50% by weight and the coating composition is water-free.

2. The water-free coating composition of claim 1, wherein the polyester is present with a fraction of 5% to 20% by weight, based on the total weight of the composition, and the weight fractions of all of the constituents add up to 100% by weight.

3. The water-free coating composition of claim 2, wherein the composition comprises
   b. 5% to 30% by weight of at least one acrylate polymer or polyurethane polymer as further binder,
   c. 5% to 20% by weight of polymer microparticles,
   d. 5% to 15% by weight of at least one polymer which comprises functional groups selected from the group consisting of blocked isocyanates and amino resins, as crosslinking agent,
   e. 5% to 49.5% by weight of at least one pigment,
   f. 30% to 50% by weight of at least one organic solvent, and
   g. 0.5% to 40% by weight of at least one auxiliary or additive,
based in each case on the total weight of the composition.

4. The water-free coating composition of claim 1, wherein the polyester has a weight-average molecular weight of 5000 to 20 000 g/mol.

5. The water-free coating composition of claim 1, wherein the fraction of epoxy groups in the polyester is 5% to 15% by weight, based on the total weight of the polyester.

6. The water-free coating composition of claim 1, having a viscosity which corresponds to a flow time of 24 s to 30 s from a Ford 4 Cup at 23° C.

7. A process of coating a substrate, the process comprising applying the water-free coating composition of claim 1 to a substrate as a coating material.

8. The process of claim 7, wherein the coating material is used for producing a functional layer in a multicoat paint system, the multicoat paint system comprising
   a. at least one functional layer A, obtained from the water-free coating composition,
   b. at least one basecoat B of at least one basecoat material, and
   c. at least one clearcoat C of at least one clearcoat material.

9. A multicoat paint system comprising
   a. at least one functional layer A, obtained from the water-free coating composition of claim 1,
   b. at least one basecoat B of at least one basecoat material, and
   c. at least one clearcoat C of at least one clearcoat material.

10. The multicoat paint system of claim 9, wherein successively first functional layer A, then basecoat B, and subsequently clearcoat C are applied to a substrate and then functional layer A, basecoat B, and clearcoat C are jointly cured.

11. The multicoat paint system of claim 9, wherein first layer A is applied to a substrate and cured and thereafter basecoat B and finally clearcoat C are applied to the substrate, and basecoat B and clearcoat C are then jointly cured.

12. A method of producing the multicoat paint system of claim 9, the method comprising applying the water-free coating composition to a substrate, subsequently applying the at least one basecoat B, and then applying the at least one clearcoat C.

13. The method of claim 12, wherein the water-free coating composition and also the basecoat B and the clearcoat C are jointly cured.

14. A method of coating a substrate, the method comprising applying the multicoat paint system of claim 9 to a substrate.

15. A substrate coated with the water-free coating composition of claim 1.

16. A substrate coated with the multicoat paint system of claim 9.

* * * * *